(12) United States Patent
Okamoto et al.

(10) Patent No.: US 9,187,368 B2
(45) Date of Patent: Nov. 17, 2015

(54) MANUFACTURING METHOD FOR GLASS PANEL WITH GLAZING GASKET AND GLAZING GASKET MOLDING APPARATUS

(75) Inventors: Yohei Okamoto, Hiratsuka (JP); Yugo Nagase, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/126,422

(22) PCT Filed: Jun. 14, 2012

(86) PCT No.: PCT/JP2012/003884
§ 371 (c)(1),
(2), (4) Date: Dec. 14, 2013

(87) PCT Pub. No.: WO2012/172801
PCT Pub. Date: Dec. 20, 2012

(65) Prior Publication Data
US 2014/0110044 A1 Apr. 24, 2014

(30) Foreign Application Priority Data
Jun. 14, 2011 (JP) ................................. 2011-131823

(51) Int. Cl.
| | |
|---|---|
| *B29C 47/02* | (2006.01) |
| *C03C 27/00* | (2006.01) |
| *B29C 47/08* | (2006.01) |
| *B29C 47/00* | (2006.01) |

(52) U.S. Cl.
CPC .............. *C03C 27/00* (2013.01); *B29C 47/0002* (2013.01); *B29C 47/003* (2013.01); *B29C 47/025* (2013.01); *B29C 47/026* (2013.01); *B29C 47/0866* (2013.01)

(58) Field of Classification Search
CPC ... B29C 47/025; B29C 47/026; B29C 47/0066; B29C 47/0866; B29C 47/0867; B29C 47/003
USPC ............. 156/244.18, 244.19, 244.24, 244.25; 264/252
See application file for complete search history.

(56) References Cited

U.S. PATENT DOCUMENTS

| | | | | |
|---|---|---|---|---|
| 5,362,428 | A | * | 11/1994 | Tsujino et al. ............... 264/40.5 |
| 5,421,940 | A | * | 6/1995 | Cornils et al. ........... 156/244.11 |
| 5,507,994 | A | * | 4/1996 | Cornils et al. ................ 264/252 |
| 5,846,465 | A | * | 12/1998 | Tsujino et al. ............... 264/252 |

(Continued)

FOREIGN PATENT DOCUMENTS

| | | |
|---|---|---|
| DE | 101 03 865 | 5/2002 |
| EP | 1808284 A1 * | 7/2007 |
| JP | H07-068620 | 3/1995 |
| JP | 2009-068191 | 4/2009 |

(Continued)

OTHER PUBLICATIONS

Machine translation of Japanese Patent Publication No. JP-2011051802A, originally published Mar. 3, 2011, 21 pages.*
International Search Report dated Sep. 11, 2012, 2 pages, Japan.

*Primary Examiner* — William Bell
(74) *Attorney, Agent, or Firm* — Thorpe North & Western

(57) ABSTRACT

In a manufacturing method for a glass panel with a gasket, an elastic member is placed on a table, and a multilayer glass panel is placed thereupon. A die is pressed against a top surface of the multilayer glass panel, thereby compressing the elastic member and glazing gasket molding material together with adhesive ejected from the application nozzle and applied to the top surface of the multilayer glass panel.

2 Claims, 18 Drawing Sheets

(56) References Cited

U.S. PATENT DOCUMENTS

2004/0118079 A1  6/2004  Orten et al.
2008/0115451 A1* 5/2008  Watanabe et al. .......... 52/745.19

FOREIGN PATENT DOCUMENTS

| JP | 2011-051802 | 3/2011 |
| WO | WO 2011-024483 | 3/2011 |

* cited by examiner

MANUFACTURING METHOD FOR GLASS PANEL WITH GLAZING GASKET AND GLAZING GASKET MOLDING APPARATUS

TECHNICAL FIELD

The present technology relates to a manufacturing method for a glass panel with a glazing gasket on which a glazing gasket is attached, and a glazing gasket molding apparatus that applies glazing gasket molding material to a glass surface.

BACKGROUND TECHNOLOGY

The applicant has already proposed a method of manufacturing a multilayer glass panel with a glazing gasket in which a multilayer glass panel is placed on a table, glazing gasket molding material is ejected from an application nozzle to a constant shape, and the glazing gasket molding material is installed on the surface of the glass panel with adhesive (Japanese Unexamined Patent Application Publication No. 2011-51802).

In this previous application, the glazing gasket molding material and the adhesive are ejected from the application nozzle while the multilayer glass panel and the application nozzle are moved relative to each other at high speed, and applied onto the surface of the glass panel.

However, when the glazing gasket molding material together with the adhesive is applied to the surface of the glass from the application nozzle that is moving at high speed, in order to properly attach the glazing gasket molding material on the glass surface, and in order to form the glazing gasket molding material to the required shape, it is desirable to apply the glazing gasket molding material ejected from an outlet to the glass surface with pressure.

Therefore, the closer the die of the application nozzle in which the outlet is formed is to the glass surface the better, so applying the glazing gasket molding material while the die is pressing against the glass surface is the most desirable in terms of applying the pressure of the glazing gasket molding material that is ejected from the outlet to the glass surface.

In other words, in order to properly attach the glazing gasket molding material to the glass surface, and in order to form the gasket molding material to the required shape, it is most desirable to apply the gasket molding material with the die pressing against the glass surface.

However, at an application starting point of the start of application and at an application finishing point at the finish of application, the quantity of gasket molding material applied is not constant. Therefore, it is conceivable that at portions that include the application starting point and the application finishing point are cut with a laser and removed, and a gasket molded body that is manufactured in advance is fitted into the removed portions.

In this case, the glass surface may be damaged due to the laser to be used while cutting the gasket molding material.

Therefore, it is conceivable that a fixture plate is placed on the glass plate, the application starting point and the application finishing point are determined on the fixture plate, the portions that include the application starting point and the application finishing point are cut with the laser on the fixture plate and removed, and the gasket molded body that is manufactured in advance is fitted into the removed portions.

In this case, if the gasket molding material is applied while the die is pressing against the glass surface, at the position of the fixture plate, a step is formed with the glass surface with the thickness of the fixture plate, so to move the die from the surface of the glass onto the fixture plate, at a position near the application finishing point, it is necessary to either raise the die and weaken the impelling force, or lower the table and weaken the impelling force.

Therefore, in order to ensure the pressing force of the die against the glass surface, an impelling mechanism or a control mechanism that can adjust the impelling force has been used conventionally. This results in the structure of the glazing gasket molding apparatus being more complex, and is also disadvantageous for reducing costs.

SUMMARY

The present technology provides a manufacturing method for a glass panel with a gasket and a glazing gasket molding apparatus with a simple configuration that are advantageous for properly attaching the glazing gasket molding material to the glass surface with adhesive, and for forming the gasket molding material to the required shape.

A manufacturing method for a glass panel with a glazing gasket according to the present technology is disclosed for ejecting glazing gasket molding material together with adhesive from an application nozzle onto a periphery of a top surface of the glass panel that is facing upwards and placed on a table, and moving the glass panel and the application nozzle relative to each other to apply the glazing gasket molding material. The method comprises: placing an elastic member made from a material that can deform elastically on the table; placing the glass panel on the elastic member; and applying the glazing gasket molding material to the top surface of the glass panel by ejecting the glazing gasket together with the adhesive slanting downward from an outlet to the rear in a direction of movement of the application nozzle, while a portion of the application nozzle in which the outlet is formed is pressed against the top surface of the glass panel to compress the elastic member.

Also, the present technology includes a glazing gasket molding apparatus for ejecting glazing gasket molding material together with adhesive from an application nozzle onto a top surface of a glass panel that is facing upwards and placed on a table, where the glass panel and the application nozzle are moved relative to one another to apply and attach the glazing gasket molding material together with the adhesive onto the periphery of the top surface of the glass panel. The apparatus comprises: a table for placing the glass panel; an elastic member made from a material that can deform elastically that is placed on the table; an application nozzle that ejects glazing gasket molding material together with adhesive from an outlet slanting downwards; a contacting means for pressing a portion of the application nozzle in which the outlet is formed onto the top surface of the glass panel that is placed on the elastic member and fixed in position; and a moving means for moving the glass panel and the application nozzle relative to each other so that the glazing gasket molding material is ejected from the outlet to the rear in a direction of movement of the application nozzle along the periphery of the top surface of the glass panel.

According to the present technology, it is possible with a simple configuration to eject glazing gasket molding material together with adhesive from the application nozzle and apply them to the surface of the glass panel, while a portion of the application nozzle in which the outlet is formed is pressed against the surface of the glass panel.

Therefore, it is possible to efficiently apply the glazing gasket molding material ejected from the outlet with pressure onto the glass surface, so even when the application nozzle is moved at high speed, it is advantageous in that the glazing gasket molding material is properly attached to the glass surface, and the glazing gasket molding material is formed with the desired shape.

Also, compared with providing a mechanical or electrical impelling mechanism on the application nozzle side or the table side, the structure is simple, which has the advantage that it is possible to reduce the cost of the gasket molding apparatus.

BRIEF DESCRIPTION OF THE DRAWINGS

FIG. 21 is an explanatory view of the die 42.

DETAILED DESCRIPTION

Figure 1A:
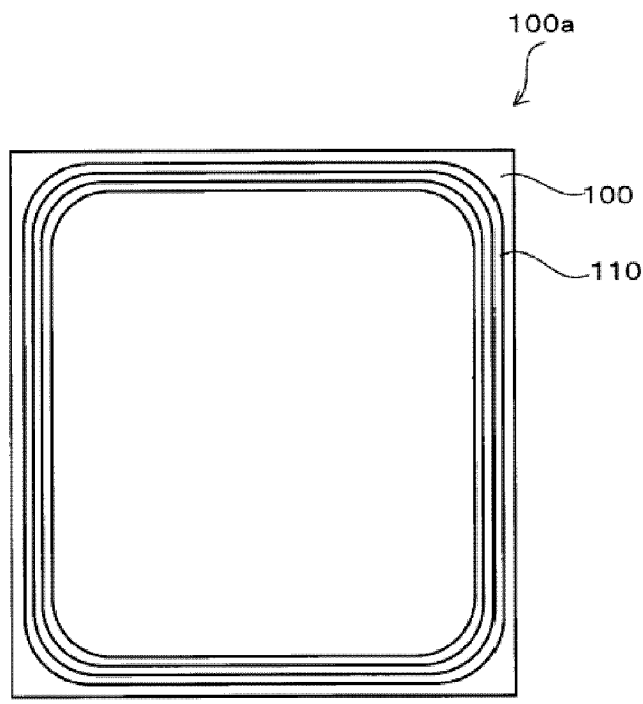
FIG. 1A is a plan view of a multilayer glass panel 100 on which a glazing gasket 110 has been formed.

Next, embodiments of the present technology will be described while referring to the drawings.

In the embodiments of the present technology, an example of the manufacture of a multilayer glass panel with a glazing gasket is taken for explanation.

First, the multilayer glass panel with a glazing gasket is described.

As illustrated in FIG. 1A, a multilayer glass panel with a glazing gasket 100A includes a multilayer glass panel 100 and a glazing gasket 110, the multilayer glass panel 100 includes two rectangular panes of glass of the same shape and size, and an air gap formed by a spacer between the peripheral edges of the two panes of glass.

The glazing gasket 110 is attached along the periphery of both surfaces of the multilayer glass panel 100 in a rectangular framework form.

Figure 2A:
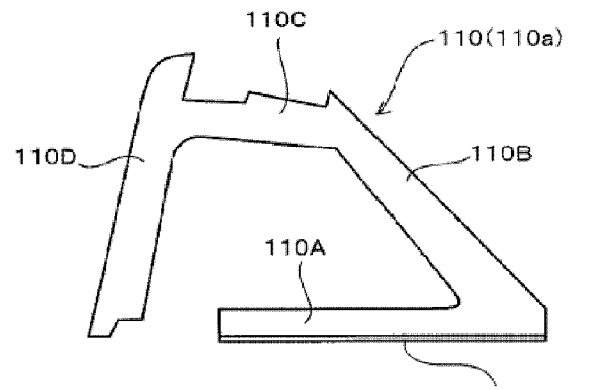
FIG. 2A is a cross-sectional view of the glazing gasket 110 and an adhesive layer 200.
Figure 2B:
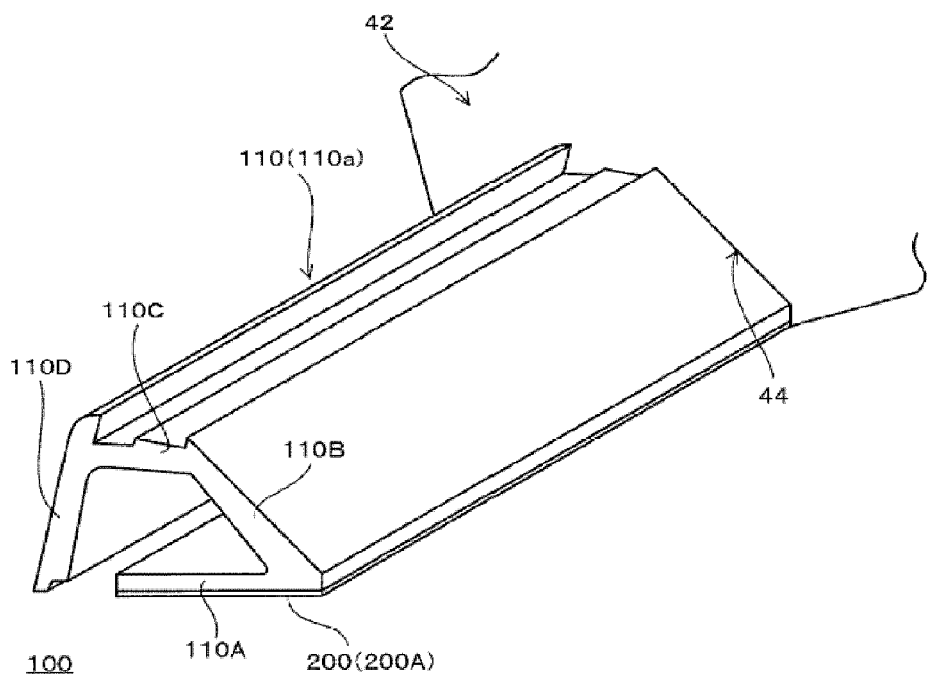
FIG. 2B is a perspective view of a glazing gasket molding material 110*a* and an adhesive 200A ejected from a die 42.

As illustrated in FIGS. 2A and 2B, the cross-sectional shape of the glazing gasket 110 in the direction orthogonal to an extending direction thereof is a trapezoidal framework shape. In other words, the glazing gasket 110 includes a bottom side 110A, a first slanting side 110B that rises from an end of the bottom side 110A, a top side 110C that extends facing the bottom side 110A from a top end of the first slanting side 110B, and a second slanting side 110D that hangs down from an end of the top side 110C toward an extension of the bottom side 110A, so that the end of the bottom side 110A is separated from a lower end of the second slanting side 110D.

An adhesive layer 200 made from adhesive 200A is provided on a bottom surface of the bottom side 110A, and the glazing gasket 110 is bonded to a surface of the multilayer glass panel 100 by the adhesive layer 200.

Next, the glazing gasket molding apparatus 10 is described with reference to FIG. 3.

The glazing gasket molding apparatus 10 applies the glazing gasket molding material 110*a* together with the adhesive 200A with a uniform cross-sectional shape along the periphery of the top surface of the multilayer glass panel 100 that is oriented upwards with the multilayer glass panel 100 in a horizontal attitude. In this way, the glazing gasket 110 is formed around the periphery of the top surface of the multilayer glass panel 100.

The glazing gasket molding apparatus 10 includes a multilayer glass panel movement mechanism 12, an elastic member 50, an application device 14, an application nozzle linear movement mechanism 16, an application nozzle swiveling mechanism 36, an application nozzle elevator mechanism 38, a fixture plate 18, and a laser cutting device 24.

The multilayer glass panel movement mechanism 12 horizontally supports the multilayer glass panel 100 and moves the multilayer glass panel 100 in the horizontal plane in the Y direction which is one of two orthogonal directions.

The multilayer glass panel movement mechanism 12 includes a table 1202 having a placement surface on which the multilayer glass panel 100 is placed, and a movement part (not illustrated) that moves the table 1202 in the Y direction.

The placement surface is a flat surface having an area greater than that of the multilayer glass panel 100.

The movement part includes a feed screw (not illustrated), a female screw member (not illustrated), a guide rod (not illustrated), an insertion part, and a pulse motor (not illustrated).

The feed screw extends in the Y direction. The female screw member is provided on the table 1202 and is screwed onto the feed screw. The guide rod extends in the Y direction. The guide rod is inserted into the insertion part. The pulse motor drives the feed screw. Therefore, the table 1202 is moved in the Y direction by rotating the pulse motor forward or reverse.

The multilayer glass panel movement mechanism 12 is not limited to the configuration described above, and it may be configured from various commonly known actuators or motion mechanisms.

The elastic member 50 is placed on the placement surface of the table 1202, and the multilayer glass panel 100 is placed on the elastic member 50.

The elastic member 50 is formed in a plate shape, is made from a material that can deform elastically, has a uniform thickness, and has an area that is greater than that of the multilayer glass panel 100 and smaller than that of the placement surface of the table 1202. As described later, it is sufficient that the elastic member 50 have a uniform thickness at least at the locations where the periphery of the multilayer glass panel 100 is placed, in order to apply the pressure of the glazing gasket molding material 110a ejected from the outlet 44 uniformly onto the surface of the multilayer glass panel 100.

Various conventional commonly known elastic materials can be used as the elastic member 50, such as so-called thermosetting elastomers obtained by vulcanizing natural rubber, synthetic rubber, or the like, thermosetting resin elastomers as typified by urethane rubber, silicone rubber, and fluorine rubber, and styrene, olefin, or polyester thermoplastic elastomers, and the like.

The application device 14 includes an application nozzle 26.

The application device 14 ejects the glazing gasket molding material 110a together with the adhesive 200A in a constant (uniform) cross-sectional shape onto the top surface of the multilayer glass panel 100 from the application nozzle 26.

Figure 19:
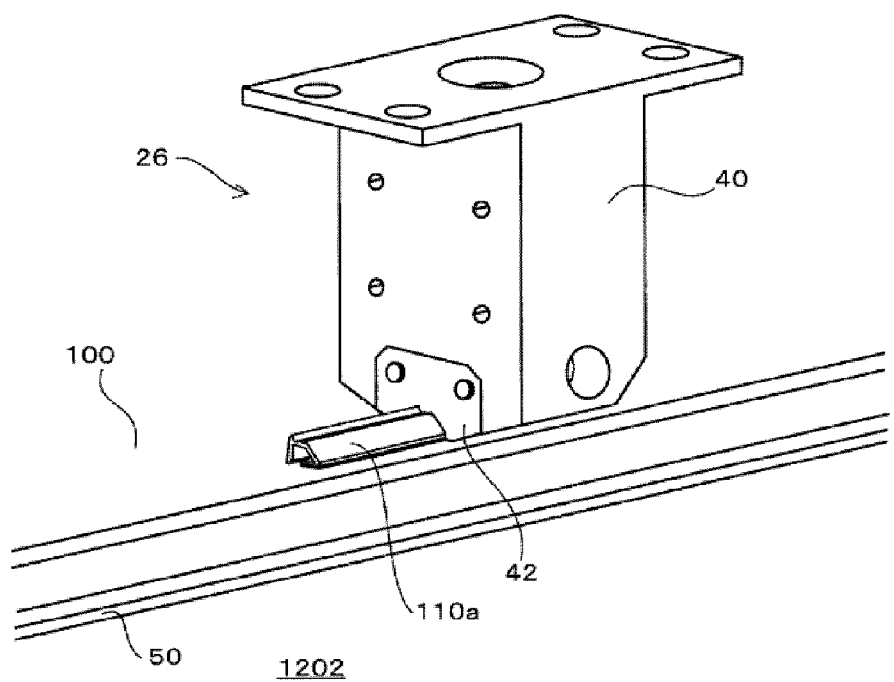
FIG. 19 is a perspective view of the application nozzle 26.
Figure 20:
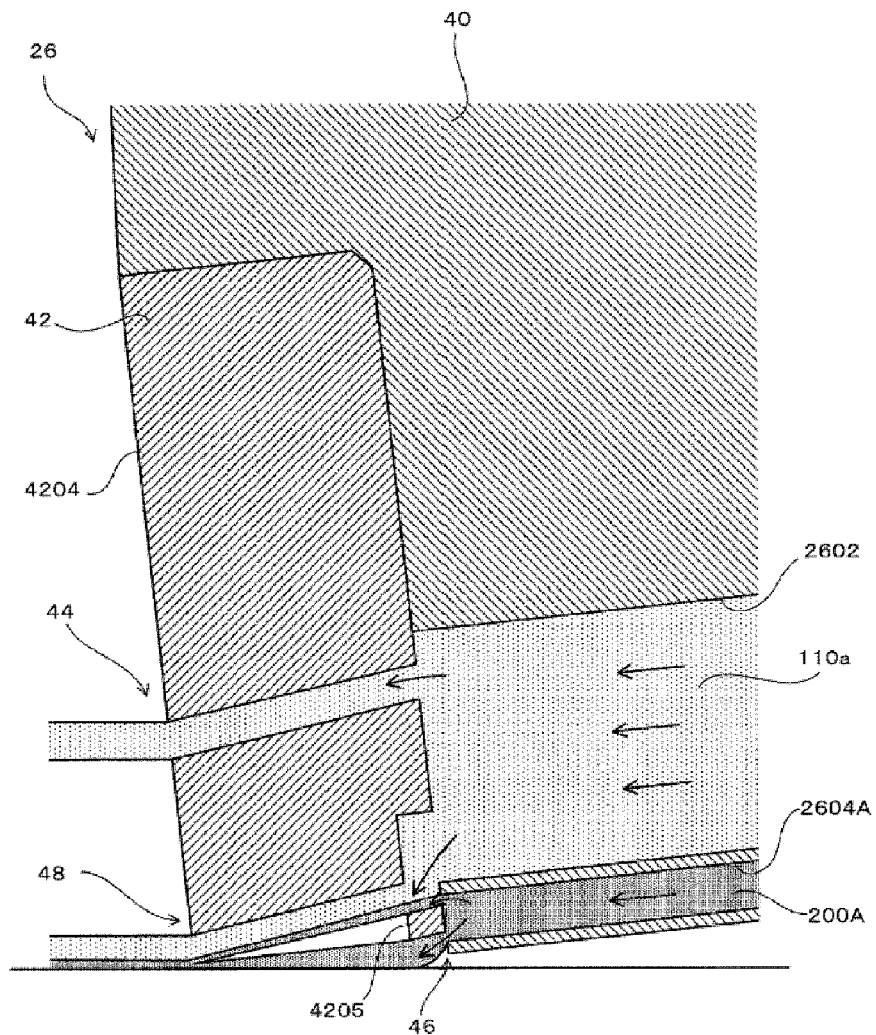
FIG. 20 is a cross-sectional view of the die 42 for explaining the flow of the glazing gasket molding material 110*a* and the adhesive 200A.

As illustrated in FIGS. 19 and 20, the application nozzle 26 is configured from a nozzle main body 40, and a die 42 for forming the glazing gasket that is attached to the nozzle main body 40.

Also, the application nozzle 26 includes a glazing gasket molding material flow path 2602 in which the glazing gasket molding material 110a is delivered under pressure, an adhesive flow path 2604 in which the adhesive 200A is delivered under pressure, and an outlet 44.

The glazing gasket molding material flow path 2602 and the adhesive flow path 2604 are provided in the nozzle main body 40, and the outlet 44 is provided in the die 42.

The glazing gasket molding material flow path 2602 is located in a position above and separated from the adhesive flow path 2604.

The glazing gasket molding material 110a in the molten state is supplied from an extruder (not illustrated) to a shot pump (not illustrated), and the glazing gasket molding material 110a in the molten state is delivered under pressure from the shot pump to the glazing gasket molding material flow path 2602. Likewise, the adhesive 200A in the molten state is supplied to a shot pump (not illustrated), and the adhesive 200A in the molten state is delivered under pressure by the shot pump to the adhesive flow path 2604.

The die 42 is fitted to a recess provided in the nozzle main body 40, and as illustrated in FIGS. 20 and 21, is attached to the nozzle main body 40 by male screws inserted into insertion holes 4202.

The die 42 has a plate shape, and includes a bottom surface 4203 that is disposed in opposition to the surface of the multilayer glass panel 100, and a side surface 4204 that faces to the outside when the die 42 is attached to the recess of the nozzle main body 40, and the side surface 4204 is positioned at the rear end when the application nozzle 26 is moved.

The outlet 44 is provided near the bottom surface 4203 of the die 42.

The outlet 44 includes a lower outlet 46, and an upper outlet 48 that is located above and separated from the lower outlet 46.

The lower portion of the adhesive flow path 2604 is connected to the lower outlet 46.

The upper outlet 48 is connected to the glazing gasket molding material flow path 2602 and to the upper portion of the adhesive flow path 2604.

The portion of the upper outlet 48 connected to the upper portion of the adhesive flow path 2604 and the lower outlet 46 have a predetermined width for ejecting the adhesive 200A.

Figure 21A:
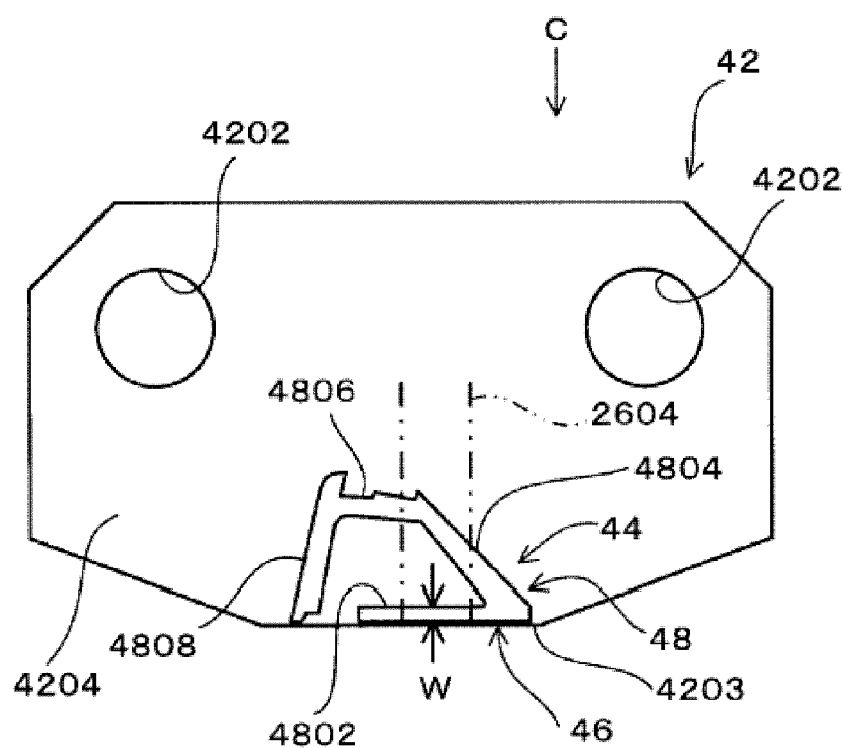
FIG. 21A is a front view.
Figure 21B:
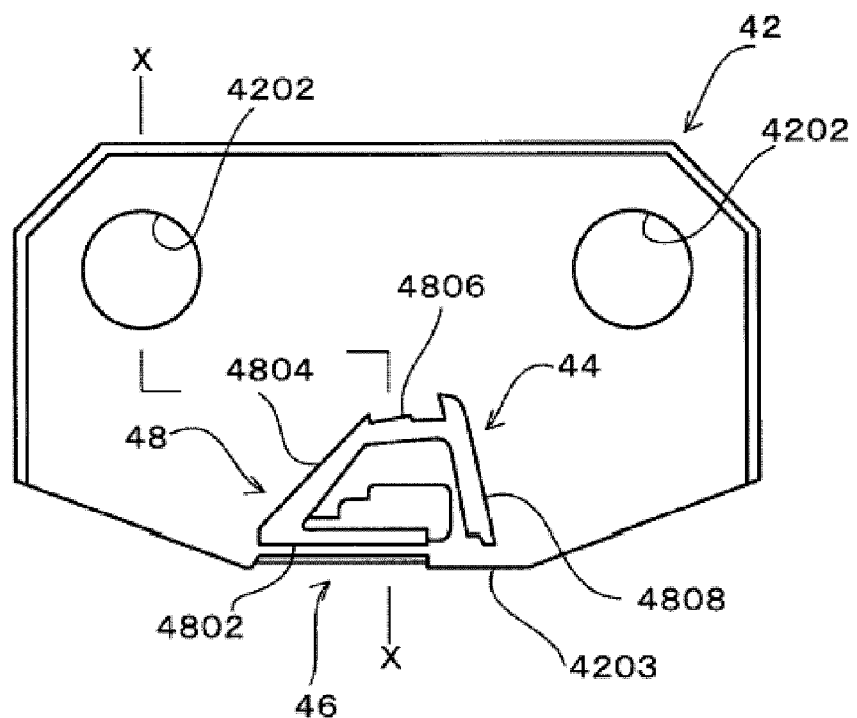
FIG. 21B is a rear view.
Figure 21C:
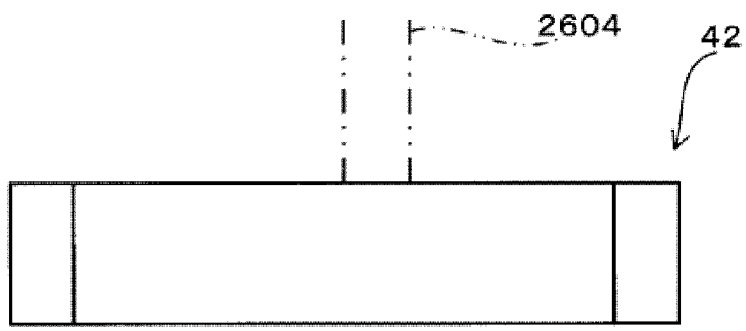
FIG. 21C is a view along the arrow C in FIG. 21A.
Figure 22:
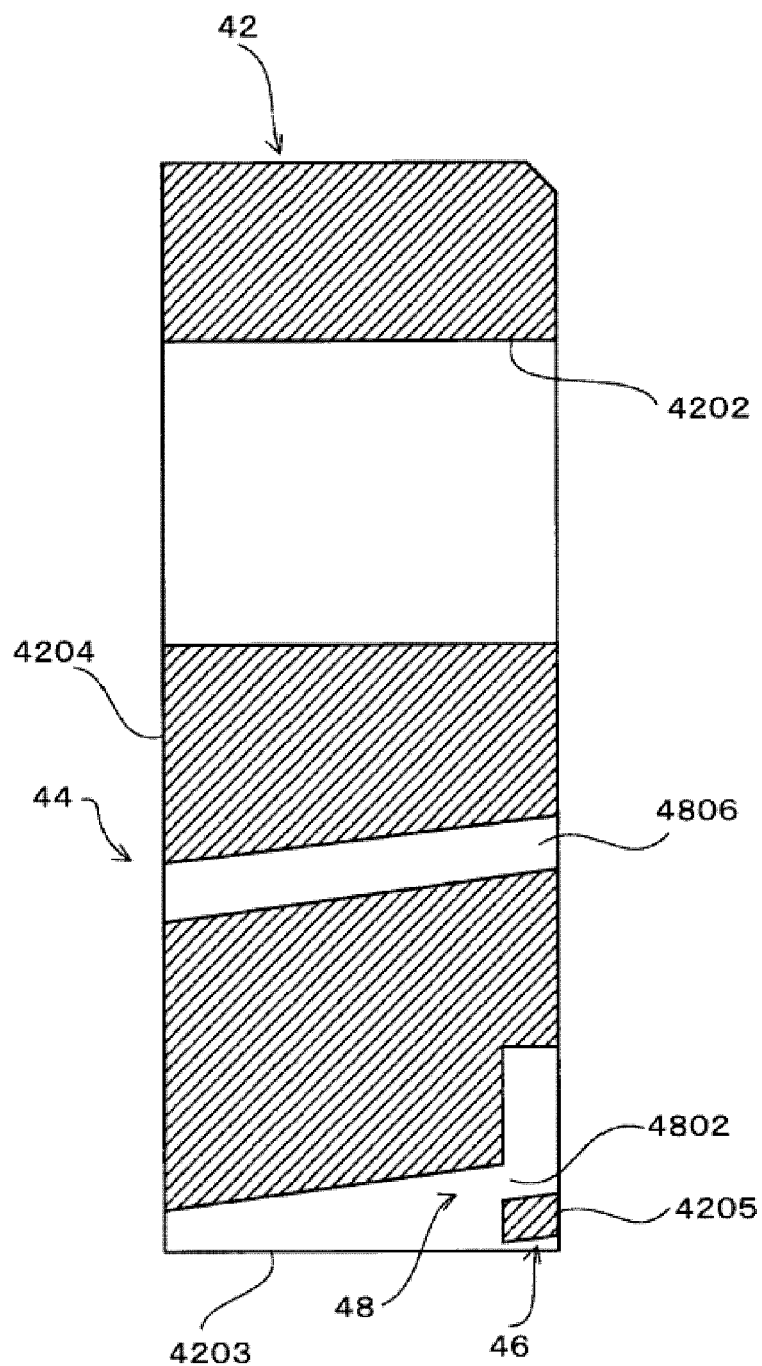
FIG. 22 is a cross-sectional view at X-X in FIG. 21B.

Also, as illustrated in FIGS. 21A and 21C, the adhesive flow path 2602 is connected to the center in the width direction of a portion of the upper outlet 48 and the center in the width direction of the lower outlet 46, and, the portion of the adhesive flow path 2604 connected to the center in the width direction of the upper outlet 48 and the center in the width direction of the lower outlet 46 extends in a direction normal to the width direction of the portion of the upper outlet 48 and the width direction of the lower outlet 46, configured so that the adhesive 200A can be ejected with pressure applied efficiently over the whole width.

The upper outlet 48 is provided with a shape that corresponds to the cross-section of the glazing gasket 110 that is to be formed. In other words, the upper outlet 48 includes a bottom side 4802, a first slanting side 4804, a top side 4806, and a second slanting side 4808 corresponding respectively to the bottom side 110A, the first slanting side 110B, the top side 110C, and the second slanting side 110D.

As illustrated in FIG. 21, a dimension W in a vertical direction of the bottom side 4802 of the upper outlet 48 is formed slightly greater than the thickness of the bottom side 110A of the glazing gasket 110, and is related to the ejection of the adhesive 200A applied to the bottom surface of the bottom side 110A of the glazing gasket molding material 110a as described below.

As illustrated in FIG. 20, a partition wall 4205 is provided extending in the horizontal direction below the bottom side 4802, and the bottom side 4802 that constitutes the upper outlet 48 and the lower outlet 46 are partitioned and separated vertically by the partition wall 4205.

Therefore, the adhesive 200A that is delivered under pressure in the adhesive flow path 2604 is separated and divided vertically by the partition wall 4205, configured so that the lower side of the divided adhesive 200A is ejected from the lower outlet 46 and applied onto the surface of the multilayer glass panel 100.

Also, the upper outlet 48 is configured so that the glazing gasket molding material 110a is ejected in a constant shape and with the adhesive 200A that has been delivered under pressure from the adhesive flow path 2604 (the adhesive 200A separated on the upper side by the partition wall 4205) applied to the bottom surface of the glazing gasket molding material 110a, and so that the adhesive 200A applied to the bottom surface of the glazing gasket molding material 110a is placed on the adhesive 200A that has been applied to the surface of the multilayer glass panel 100, so that the glazing gasket molding material 110a together with the adhesive 200A that has been applied on the bottom surface of the glazing gasket molding material 110a is applied on the adhesive 200A that has been applied to the surface of the multilayer glass panel 100A, and the adhesion of the glazing gasket molding material 110a onto the surface of the multilayer glass panel 100 is increased.

When the glazing gasket molding material 110a and the adhesive 200A are applied, the lower end of the die 42 is pressed against the surface of the multilayer glass panel 100, and with the die 42 assembled onto the nozzle main body 40, to the front in the forward direction of the portion of the die 42 that is pressed against the top surface of the multilayer glass panel 100, an inclined surface is formed that gradually separates from the top surface of the multilayer glass panel 100 toward the front, as illustrated in FIGS. 14 to 16 and FIG. 20. As illustrated in FIGS. 20, 21A, 21B, and 22, the inclined surface is the bottom surface 4203 of the die 42 located on both sides of the lower outlet 46.

By providing such an inclined surface, it is possible for the die 42 to smoothly rise from the top surface of the multilayer glass panel 100 onto the fixture plate 18.

Also, by inclining the die 42 in this way, when the glazing gasket molding material 110a and the adhesive 200A are applied, the upper outlet 48 and the lower outlet 46 are oriented so that the glazing gasket molding material 110a and the adhesive 200A are pressed onto the surface of the multilayer glass panel 100 in an inclined direction that is inclined toward the vertical direction, so the glazing gasket molding material 110a and the adhesive 200A under pressure are pressed out toward the top surface of the multilayer glass panel 100, so the adhesion of the glazing gasket molding material 110a is further increased, and the glazing gasket molding material 110a is formed in the required shape.

Figure 3:
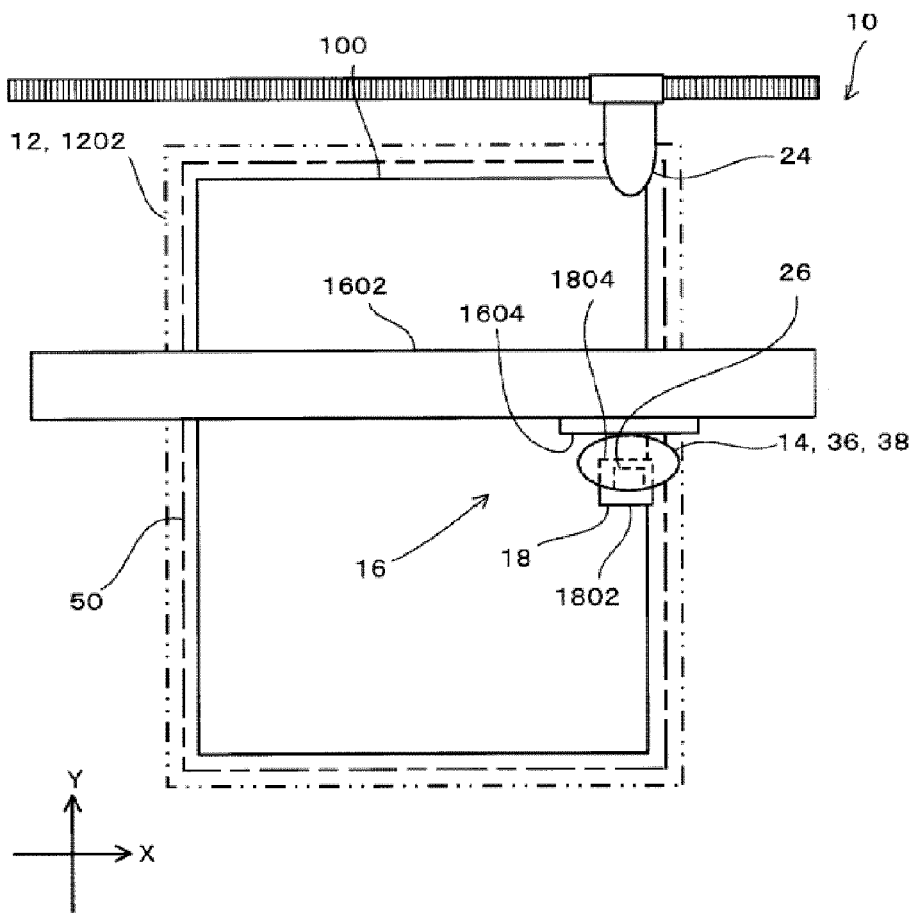
FIG. 3 is a plan view for explaining the state before start of the operation of applying the glazing gasket molding material 110*a* by a glazing gasket molding apparatus 10.

As illustrated in FIG. 3, the application nozzle linear movement mechanism 16 moves the application nozzle 26 in the horizontal plane in the X direction, which is the other of the two orthogonal directions, so that the application nozzle 26 is in a position above the top surface of the multilayer glass panel 100 supported by the multilayer glass panel movement mechanism 12.

The application nozzle linear movement mechanism 16 includes a guide rail 1602 that is supported by a frame (not illustrated), and extends in the X direction above the table 1202 of the multilayer glass panel movement mechanism 12, and an X axis carrier 1604.

The X axis carrier 1604 is provided so that it can move forward and backward along the X axis direction on the guide rail 1602 in the horizontal plane. The application nozzle 26 is supported by the X axis carrier 1604.

The application nozzle linear movement mechanism 16 includes a drive unit that includes a feed screw and a pulse motor and the like to move the X axis carrier 1604 in the X direction.

Therefore, the application nozzle 26 is moved in the X direction by rotating the pulse motor forward or reverse.

The application nozzle linear movement mechanism 16 is not limited to the configuration described above, and it may be configured from various commonly known actuators or motion mechanisms.

The application nozzle swiveling mechanism 36 changes the orientation of the application nozzle 26 at the corners of the multilayer glass panel 100, and is supported by the X axis carrier 1604.

The application nozzle swiveling mechanism 36 swivels the application nozzle 26 in the horizontal plane about an axis that extends in the vertical direction, so that at each corner of the multilayer glass panel 100, the orientation of the application nozzle 26 is changed by 90° each time to 0°, 90°, 180°, 270°, and 0°. In this way, the direction of application of the glazing gasket molding material 110a is changed by 90° each time from 90°, 180°, 270°, to 0°.

The application nozzle swiveling mechanism 36 includes a swiveling platform to which the application nozzle 26 is attached, a bearing mechanism that supports the swiveling platform so that it can swivel about a vertical axis, and a pulse motor that rotates the swiveling platform.

Therefore, the application nozzle 26 is swiveled about an axis that extends in the vertical direction by rotating the pulse motor forward or reverse.

The application nozzle swiveling mechanism 36 is not limited to the configuration described above, and it may be configured from various commonly known actuators or motion mechanisms.

The application nozzle elevator mechanism 38 raises and lowers the application nozzle 26 on the swiveling platform at the application starting point where application of the glazing gasket molding material 110a starts and the application finishing point where the application finishes.

Also, the application nozzle elevator mechanism 38 retracts the application nozzle 26 to a retracted position above the glazing gasket molding material 110a that has been applied to the multilayer glass panel 100. In this way, the application nozzle 26 is prevented from interfering with the glazing gasket molding material 110a after it has been applied, so it is possible to move the multilayer glass panel 100 out and in.

The application nozzle elevator mechanism 38 includes a drive unit that includes a feed screw for raising and lowering the application nozzle 26, a pulse motor for driving the feed screw, and the like.

Therefore, the application nozzle 26 is raised and lowered by rotating the pulse motor forward or reverse.

The application nozzle elevator mechanism 38 is not limited to the configuration described above, and it may be configured from various commonly known actuators or motion mechanisms.

Also, in this embodiment, contacting means for pressing the portion (die 42) of the application nozzle 26 in which the outlet 44 is formed against the top surface of the multilayer glass panel 100 so that the pressure of the glazing gasket molding material 110a that is ejected from the outlet 44 is applied to the top surface of the multilayer glass panel 100 is constituted by the application nozzle elevator mechanism 38.

Figure 18:
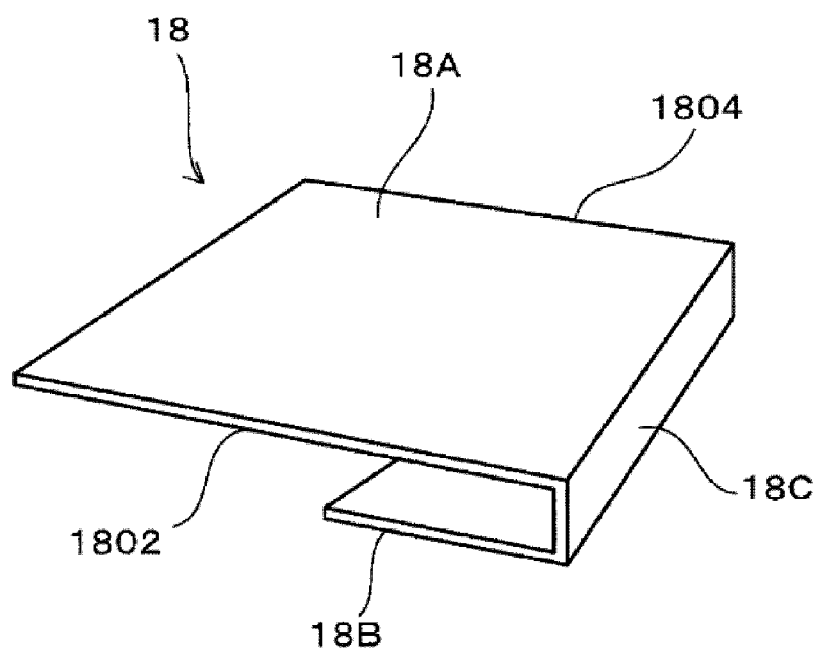
FIG. 18 is a perspective view of the fixture plate 18.

As illustrated in FIG. 18, the fixture plate 18 has a C-shaped cross-section having a first plate portion 18A and a second plate portion 18B mutually opposing to each other so that they are capable of sandwiching the multilayer glass panel 100, and a connecting plate portion 18C that connects the ends of the plates 18A and 18B.

When the first plate portion 18A and the second plate portion 18B are sandwiching the multilayer glass panel 100, the fixture plate 18 is detachably attached so that it cannot move on the periphery of the multilayer glass panel 100.

The length that the first plate portion 18A projects from the connecting plate portion 18C is greater than the length that the second plate portion 18B projects from the connecting plate portion 18C. In other words, when the glazing gasket 110 is formed on both sides of the multilayer glass panel 100, the first plate portion 18A is formed to be a length of the glazing gasket molding material 110a being applied to the first plate portion 18A, and the second plate portion 18B is formed to be a length of not interfering with the already formed glazing gasket 110, when the first plate portion 18A and the second plate portion 18B sandwich the multilayer glass panel 100, and the connecting plate portion 18C is in contact with the end surface of the multilayer glass panel 100.

Two mutually opposite sides 1802, 1804 are formed in the first plate portion 18A.

The fixture plate 18 is formed from a material that does not permit laser light to penetrate, and various conventional commonly known materials can be used such as a metal material such as stainless steel or the like, or a glass material or the like.

The thickness of the fixture plate 18 varies depending on the material of the fixture plate 18 and the laser light to be used, but in this embodiment, 0.2 mm thick stainless steel is used as the fixture plate 18.

By applying a surface treatment to the surface of the fixture plate 18 in order to increase its releasing properties, the glazing gasket molding material 110a and the adhesive 200A as described later applied on the fixture plate 18 can be easily peeled off. Various commonly known conventional surface treatments can be used as the surface treatment, such as a fluorine resin coating or the like.

The laser cutting device 24 cuts glazing gasket 110 by irradiating it with laser light.

A laser marker or the like that forms lines or characters on the surface of various materials by irradiating it with laser light can be used as the laser cutting device 24, for example.

There are various wavelengths that can be used as the laser light emitted from the laser cutting device 24, provided they can reliably cut the glazing gasket 110. Various types of commonly known laser light such as a YAG laser or the like can be used as the laser light.

Next, the application of the glazing gasket molding material 110a on the top surface of the multilayer glass panel 100 is described with reference to FIGS. 3 to 17.

First, as illustrated in FIG. 3, the multilayer glass panel 100 is placed on the placement surface of the table 1202 in a horizontal attitude, its position is determined within a plane parallel to the placement surface, and it is fixed so that it cannot move on the placement surface.

Positioning of the multilayer glass panel 100 is carried out by, for example, bringing two orthogonal sides of a corner of the multilayer glass panel 100 into contact with a positioning member provided on the placement surface. Also, fixing the multilayer glass panel 100 is carried out using jigs (not illustrated).

Figure 9:
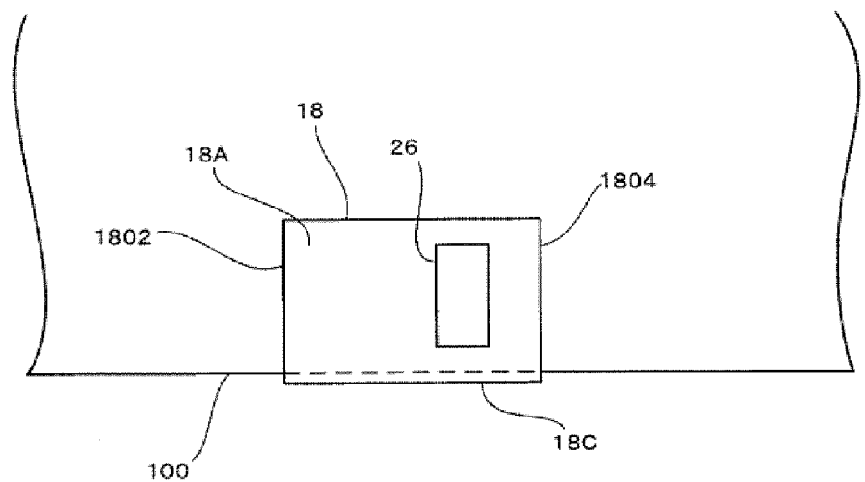
FIG. 9 is a plan view illustrating the state with a fixture plate 18 attached to the multilayer glass panel 100.

Next, the fixture plate 18 is attached to the periphery of the multilayer glass panel 100, as illustrated in FIG. 9. In other words, the first plate portion 18A is positioned on the top surface of the multilayer glass panel 100, the second plate portion 18B is positioned on the bottom surface of the multilayer glass panel 100, the connecting plate portion 18C is brought into contact with the edge surface of the multilayer glass panel 100, so that the multilayer glass panel 100 is sandwiched between the first plate portion 18A and the second plate portion 18B, and the fixture plate 18 is attached to the multilayer glass panel 100 so that it cannot move. In this attitude, the two sides 1802, 1804 of the first plate portion 18A are orthogonal to the long side of the multilayer glass panel 100.

The fixture plate 18 may be attached manually by an operator, or it may be attached automatically by a work robot.

In this case, the application nozzle 26 is positioned above the first plate portion 18A.

Figure 14:
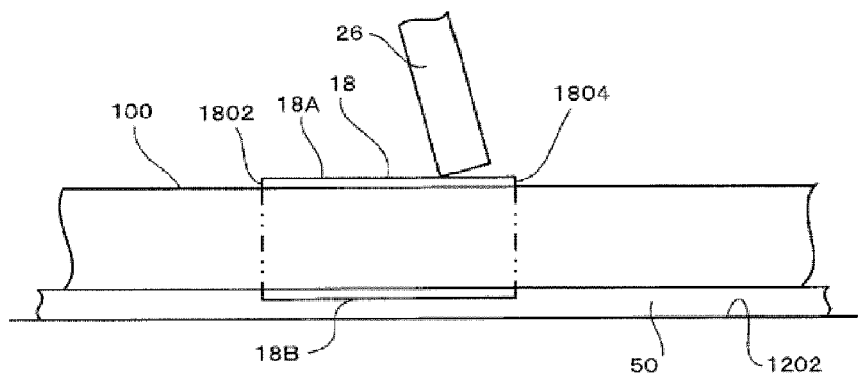
FIG. 14 is a side view illustrating the state with the fixture plate 18 attached to the multilayer glass panel 100, and the die 42 pressed against the fixture plate 18.

Next, the application nozzle 26 and the multilayer glass panel 100 are moved relative to each other with the application nozzle 26 positioned above the first plate portion 18A. Then, as illustrated in FIG. 14, the application nozzle 26 is lowered, the lower end of the die 42 is pressed against the first plate portion 18A, and the elastic member 50 is compressed. In other words, the lower end of the die 42 is pressed against the top surface of the multilayer glass panel 100 via the fixture plate 18, and the elastic member 50 is compressed.

Figure 4:
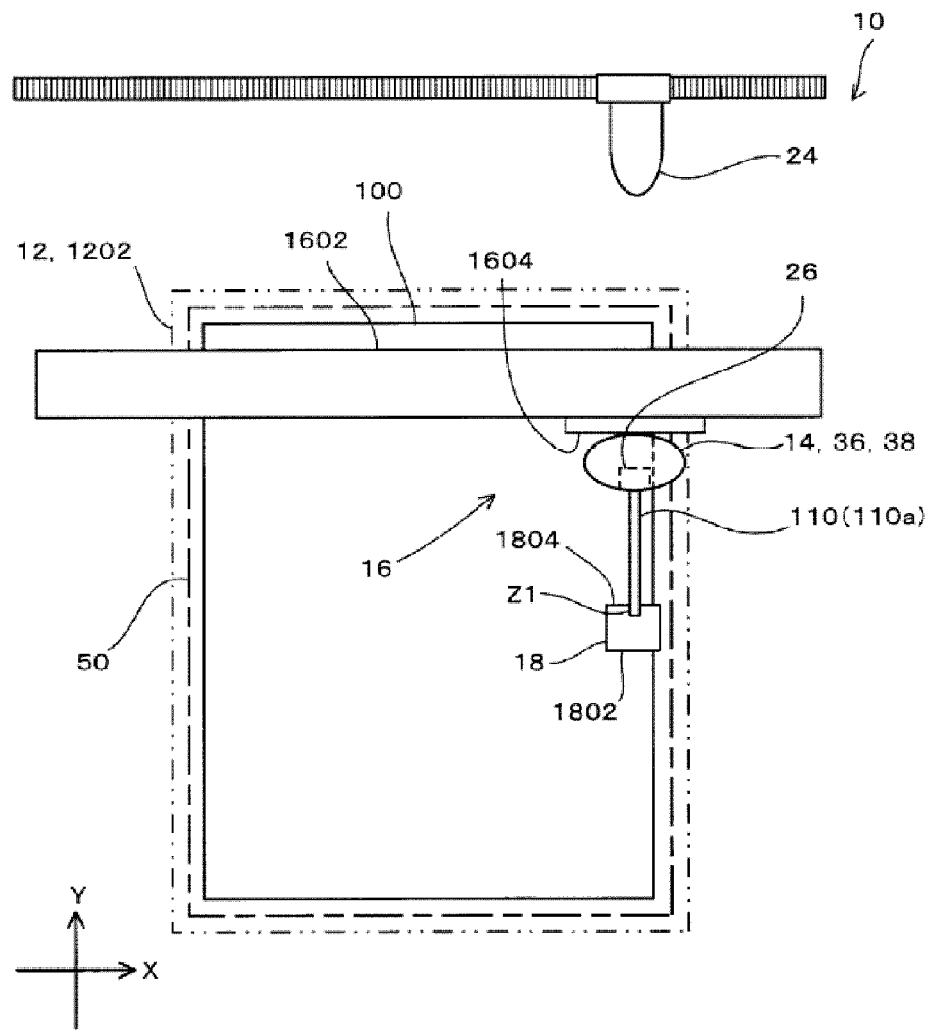
FIG. 4 is a plan view for explaining the operation of applying the glazing gasket molding material 110*a* by the glazing gasket molding apparatus 10.
Figure 10:
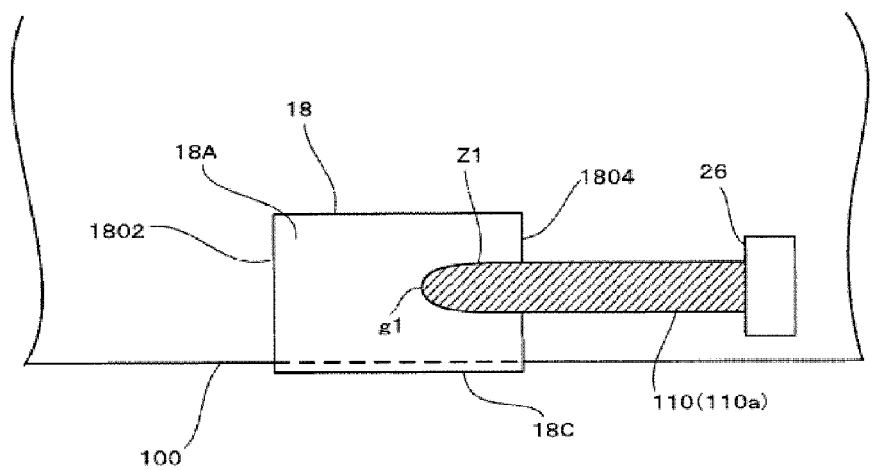
FIG. 10 is a plan view illustrating the state with the first application portion Z1 applied on the fixture plate 18.
Figure 15:
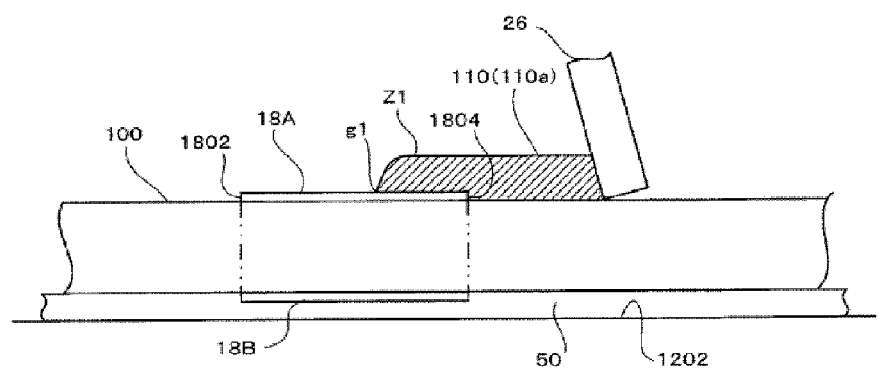
FIG. 15 is a side view illustrating the state with the first application portion Z1 applied on the fixture plate 18.
Figure 16:
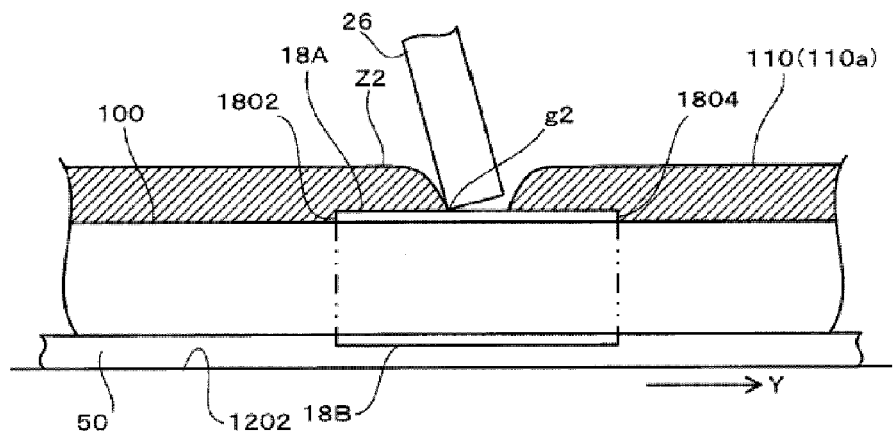
FIG. 16 is a side view illustrating the state with the second application portion Z2 applied on the fixture plate 18.

In this attitude, as illustrated in FIGS. 4, 10, and 15, the glazing gasket molding material 110a and the adhesive 200A are ejected together from the application nozzle 26 and applied onto the first plate portion 18A while the multilayer glass panel 100 and the application nozzle 26 are moved relative to each other.

In this case, the multilayer glass panel 100 and the application nozzle 26 are moved relative to each other from a first side 1802 to a second side 1804 of the two sides 1802, 1804 that are facing the glazing gasket molding material 110a.

In this embodiment, this relative movement is performed by keeping the application nozzle 26 stationary, and moving the multilayer glass panel 100 in the Y direction by the multilayer glass panel movement mechanism 12.

In this way, the first application portion Z1 which includes an application starting point g1 of the glazing gasket molding material 110a is formed on the fixture plate 18 extending along the Y direction.

Next, the application nozzle 26 is moved from the first plate portion 18A onto the surface of the multilayer glass panel 100 by moving the multilayer glass panel 100 and the application nozzle 26 relative to each other. Then, the glazing gasket molding material 110a and the adhesive 200A are applied together in a constant cross-sectional shape onto the periphery of the multilayer glass panel 100 continuous with the first application portion Z1. Specifically, as illustrated in FIG. 4, the application nozzle 26 is kept stationary, and the multilayer glass panel 100 is moved in the Y direction by the multilayer glass panel movement mechanism 12.

In this case also, application of the glazing gasket molding material 110a onto the top surface of the multilayer glass panel 100 is carried out while the lower end of the die 42 is pressed against the top surface of the multilayer glass panel 100, and the elastic member 50 is compressed.

When the glazing gasket molding material 110a is applied, the lower end of the die 42 is pressed against the top surface of the multilayer glass panel 100, and the elastic member 50 is constantly compressed, so the step due to the thickness of the first plate portion 18A can be absorbed by the change in the amount of compression of the elastic member 50, and the lower end of the die 42 is pressed against the top surface of the multilayer glass panel 100, so it is not necessary to operate the application nozzle elevator mechanism 38. In other words, it is not necessary to operate the application nozzle elevator mechanism 38 every time the die 42 rises onto or drops off the first plate portion 18A. In this case, when the die 42 is positioned on the first plate portion 18A, and when the die 42 is positioned on the multilayer glass panel 100, the amount of compression of the elastic member 50 varies precisely, and when the die 42 is positioned on the first plate portion 18A, the amount of compression of the elastic member 50 is increased by 0.2 mm.

If the application nozzle 26 arrives at the top right corner of the multilayer glass panel 100, the application nozzle 36 is swiveled through 90° in the counterclockwise direction by the application nozzle swiveling mechanism 36, and the multilayer glass panel movement mechanism 12 is stopped.

Next, the multilayer glass panel 100 and the application nozzle 26 are moved relative to each other, specifically, the multilayer glass panel 100 is kept stationary, and the application nozzle 26 is moved along the X direction by the application nozzle linear movement mechanism 16.

If the application nozzle 26 arrives at the top left corner of the multilayer glass panel 100, the application nozzle 36 is swiveled through 90° in the counterclockwise direction by the application nozzle swiveling mechanism 36, and the application nozzle linear movement mechanism 16 is stopped.

Next, the multilayer glass panel 100 and the application nozzle 26 are moved relative to each other, specifically, the application nozzle 26 is kept stationary, and the multilayer glass panel 100 is moved along the Y direction by the multilayer glass panel movement mechanism 12.

If the application nozzle 26 arrives at the bottom left corner of the multilayer glass panel 100, the application nozzle 36 is swiveled through 90° in the counterclockwise direction by the application nozzle swiveling mechanism 36, and the multilayer glass panel movement mechanism 12 is stopped.

Figure 5:
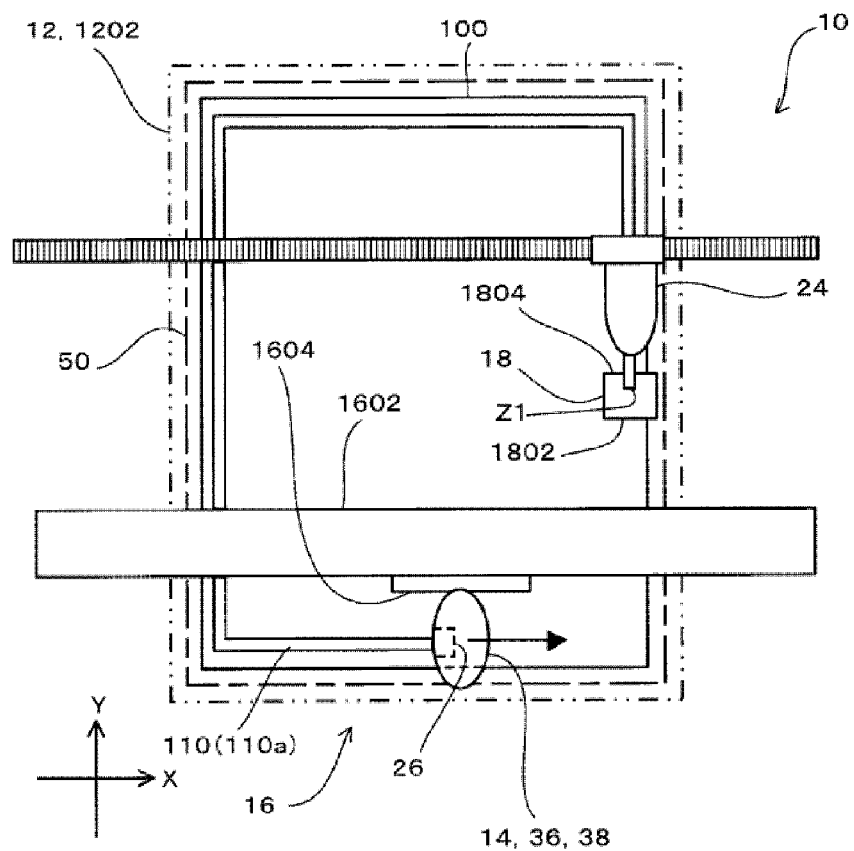
FIG. 5 is a plan view for explaining the operation of applying the glazing gasket molding material 110*a* by the glazing gasket molding apparatus 10.

Next, as illustrated in FIG. 5, the multilayer glass panel 100 and the application nozzle 26 are moved relative to each other, specifically, the multilayer glass panel 100 is kept stationary, and the application nozzle 26 is moved along the X direction by the application nozzle linear movement mechanism 16.

If the application nozzle 26 arrives at the bottom right corner of the multilayer glass panel 100 in FIG. 5, the application nozzle 36 is swiveled through 90° in the counterclockwise direction by the application nozzle swiveling mechanism 36, and the application nozzle linear movement mechanism 16 is stopped.

Next, the multilayer glass panel 100 and the application nozzle 26 are moved relative to each other, specifically, the application nozzle 26 is stationary, and the multilayer glass panel 100 is moved along the Y direction by the multilayer glass panel movement mechanism 12.

Figure 6:
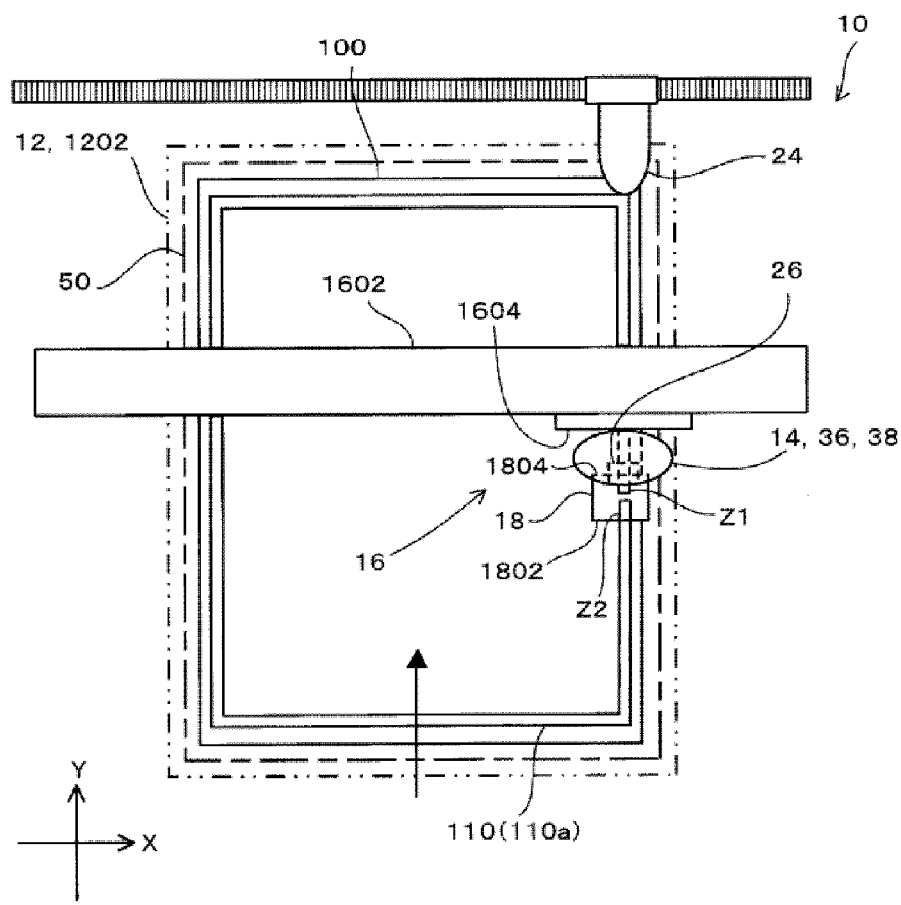
FIG. 6 is a plan view for explaining the state when the operation of applying the glazing gasket molding material 110*a* by the glazing gasket molding apparatus 10 has been stopped.
Figure 11:
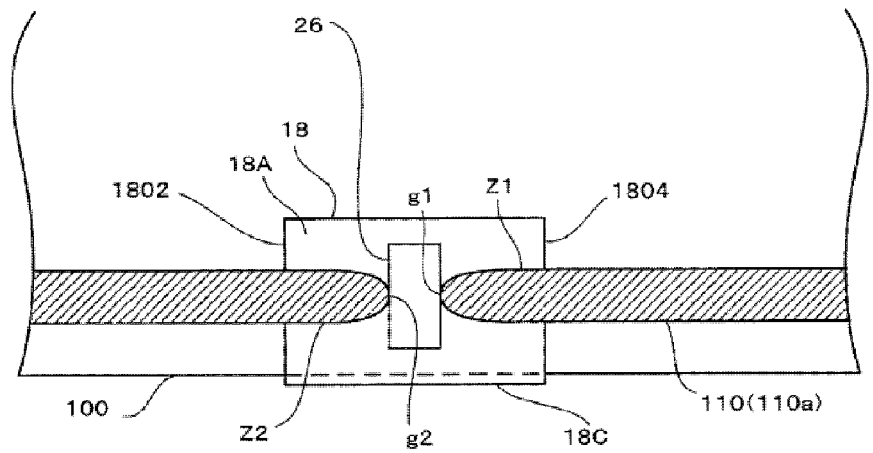
FIG. 11 is a plan view illustrating the state with the second application portion Z2 applied on the fixture plate 18.

Finally, as illustrated in FIG. 6 and FIG. 11, the application nozzle 26 is moved from the top surface of the multilayer glass panel 100 onto the fixture plate 18, and the multilayer glass panel 100 and the application nozzle 26 continue to be moved relative to each other. Specifically, the application nozzle 26 is kept stationary, and the multilayer glass panel 100 is moved along the Y direction by the multilayer glass panel movement mechanism 12.

In this case also, the step due to the thickness of the first plate portion 18A is absorbed by the change in the amount of compression of the elastic member 50, without operating the application nozzle elevator mechanism 38.

In this way, the glazing gasket molding material 110a that is applied with a constant cross-sectional shape extends on the fixture plate 18 from the first side 1802 of the fixture plate 18 to the second side 1804, and ejection of the glazing gasket molding material 110a and the adhesive 200A is stopped. As a result, the second application portion Z2 that includes an application finishing point g2 of the glazing gasket molding material 110a is formed on the first plate portion 18A.

Next, after the application nozzle 26 has been retracted to the retraction position by the application nozzle elevator mechanism 38, the multilayer glass panel 100 and the application nozzle 26 are moved relative to each other, specifically, the application nozzle 26 is kept stationary, and the multilayer glass panel 100 is moved along the Y direction by the multilayer glass panel movement mechanism 12.

Figure 7:
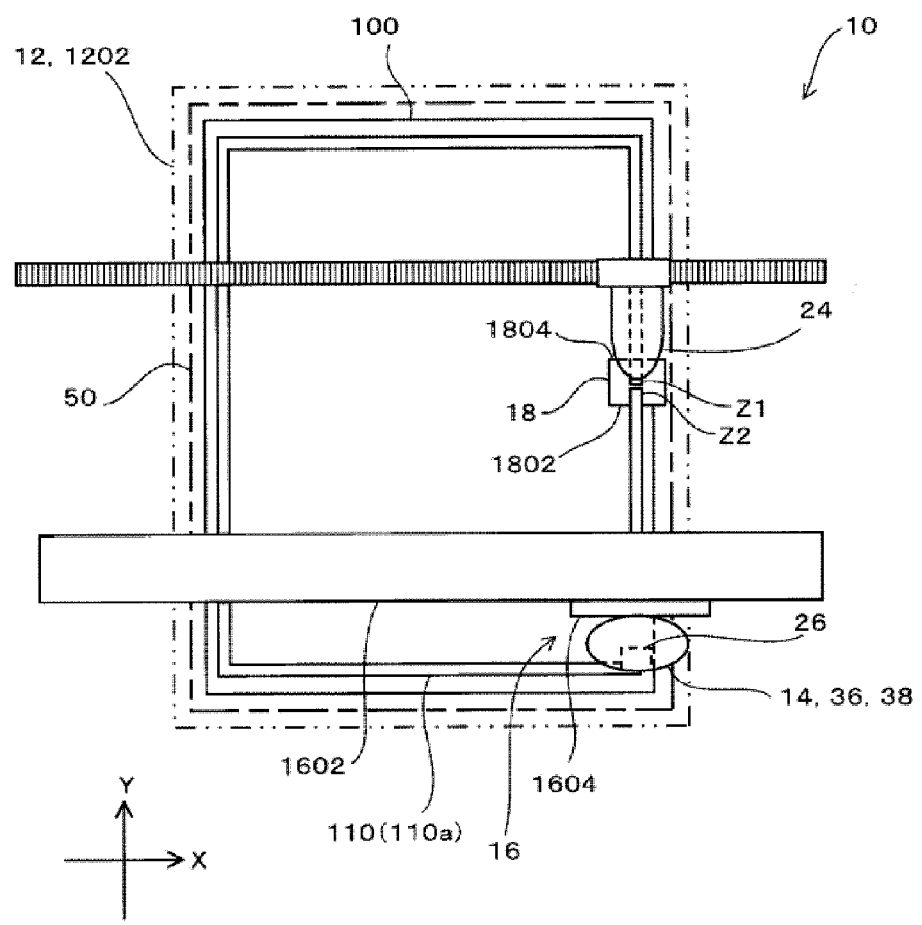
FIG. 7 is a plan view for explaining the operation of cutting a first application portion Z1 and a second application portion Z2 of the glazing gasket molding material 110*a* by the glazing gasket molding apparatus 10.

Then, as illustrated in FIG. 7, when the first application portion Z1 has reached the position of irradiation with laser light by the laser cutting device 24, the laser cutting device 24 is operated.

Figure 8A:
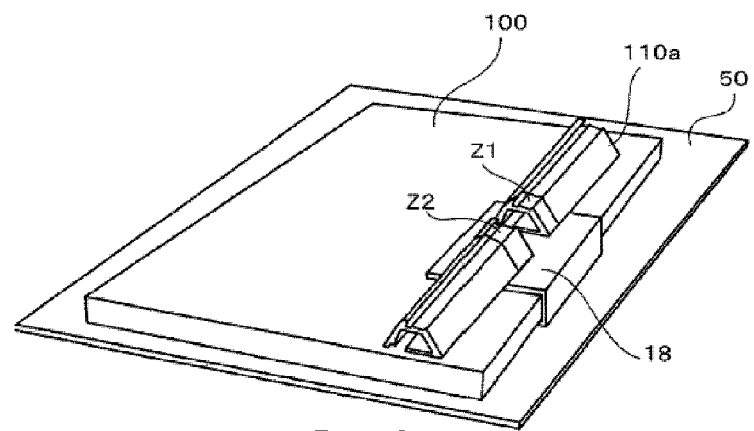
FIGS. 8A and 8B are explanatory views for explaining cutting the first application portion Z1 and the second application portion Z2 of the glazing gasket molding material 110*a*, the removal thereof, and the fitting of the glazing gasket molding body.
Figure 12:
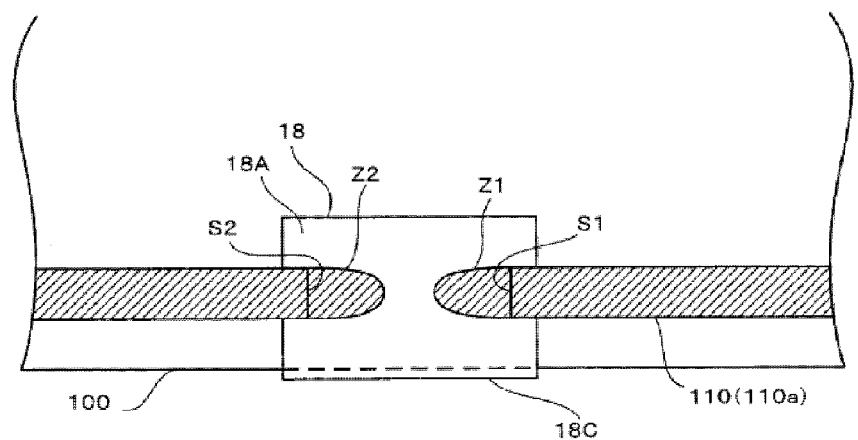
FIG. 12 is a plan view illustrating the state in which a first cut surface S1 is formed in the first application portion Z1 and a second cut surface S2 is formed in the second application portion Z2 applied to the fixture plate 18.
Figure 17:
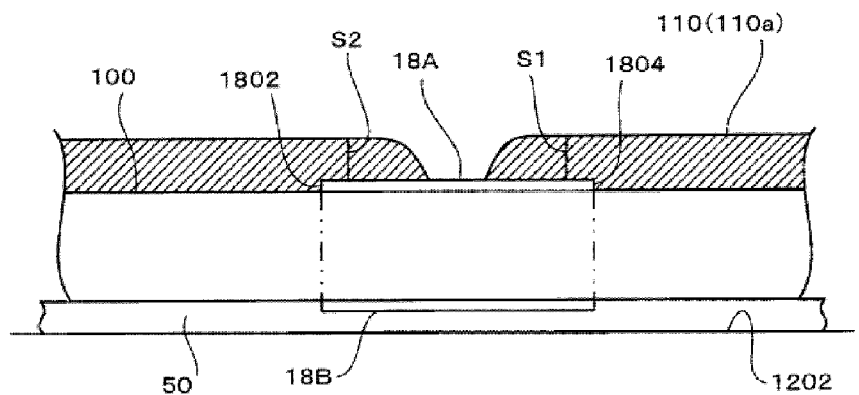
FIG. 17 is a side view illustrating the state in which the first cut surface S1 is formed in the first application portion Z1 and the second cut surface S2 is formed in the second application portion Z2 applied to the fixture plate 18.

In other words, the first application portion Z1 applied to the first plate portion 18A is cut by irradiation with laser light on the first plate portion 18A. In this way, as illustrated in FIG. 8A, FIG. 12, and FIG. 17, the first cut surface S1 is formed in the glazing gasket molding material 110a applied to the top surface of the multilayer glass panel 100.

When the first application portion Z1 is cut, the multilayer glass panel 100 is moved further in the Y direction by the multilayer glass panel movement mechanism 12.

Then, when the second application portion Z2 has reached the position of irradiation with laser light by the laser cutting device 24, the laser cutting device 24 is operated.

In other words, the second application portion Z2 applied to the first plate portion 18A is cut by irradiation with laser light on the first plate portion 18A. In this way, as illustrated in FIG. 12 and FIG. 17, the second cut surface S2 is formed in the glazing gasket molding material 110a applied to the top surface of the multilayer glass panel 100.

Figure 8B:
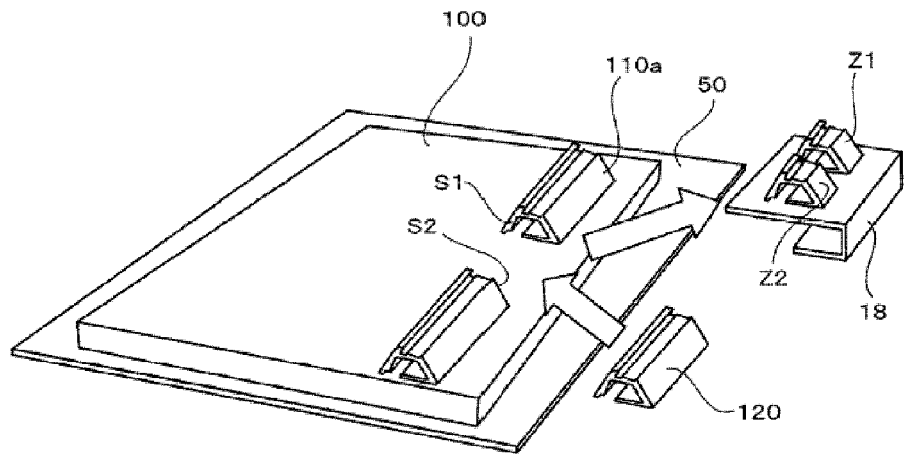
Figure 13:
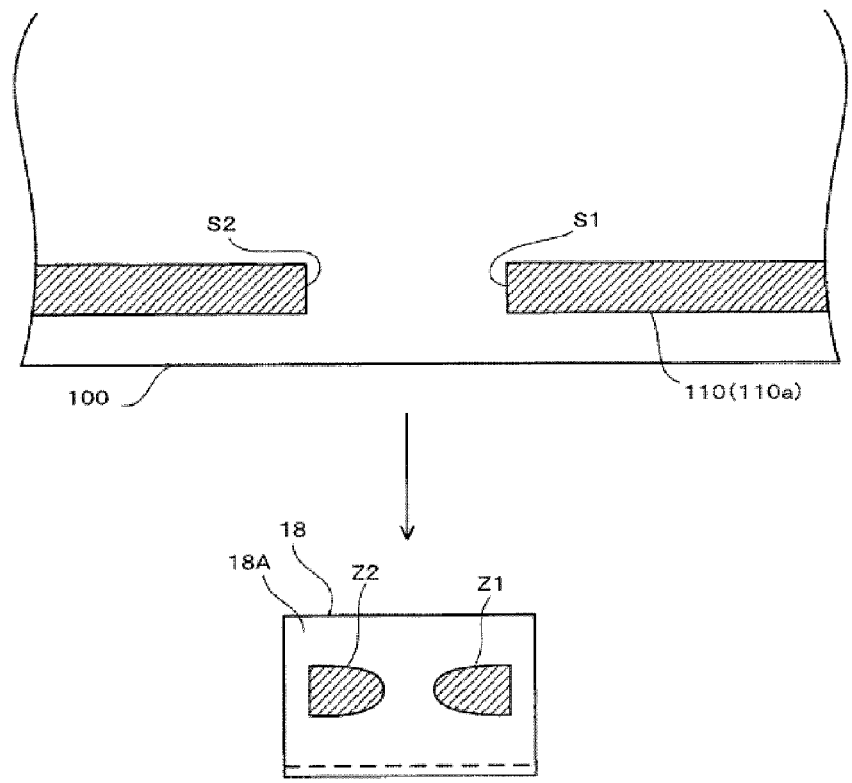
FIG. 13 is a plan view illustrating the state with the fixture plate 18 removed from the multilayer glass panel 100.

When the first application portion Z1 and the second application portion Z2 have been cut in this way, the fixture plate 18 is removed from the multilayer glass panel 100, as illustrated in FIG. 8B and FIG. 13.

More specifically, the fixture plate 18 on which the first application portion Z1 which includes the application starting point g1 and the second application portion Z2 which includes the application finishing point g2 are placed is removed from the multilayer glass panel 100 together with the application portions.

Removing the fixture plate 18 may be performed manually by an operator, or it may be performed automatically by a work robot.

Also, when the fixture plate 18 is removed from the multilayer glass panel 100, the first application portion Z1 and the second application portion Z2 remaining on the first plate portion 18A are returned to the top surface of the multilayer glass panel 100.

More specifically, the first application portion Z1 having the first cut surface S1 and the second application portion Z2 having the second cut surface S2 remaining on the first plate portion 18A that are continuous with the glazing gasket molding material 110a and the adhesive applied to the top surface of the multilayer glass panel 100 are returned to the top surface of the multilayer glass panel 100.

Figure 1B:
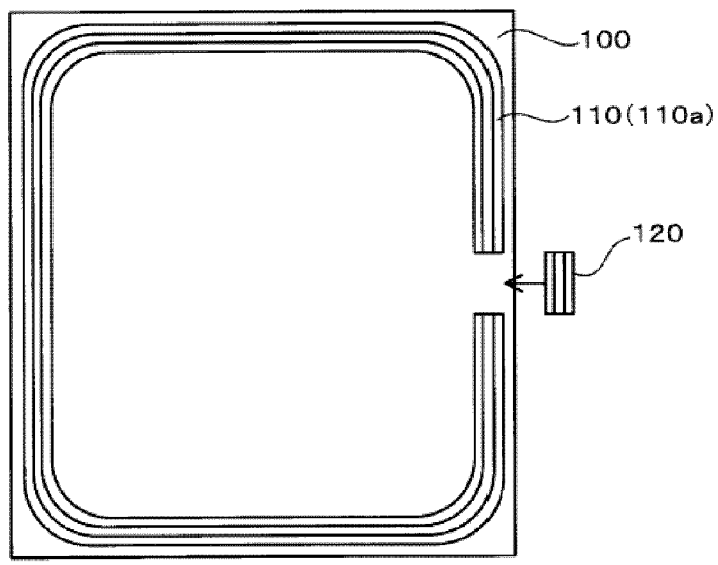
FIG. 1B is a plan view of the multilayer glass panel 100 before attachment of a glazing gasket molding body 120.

Then, as illustrated in FIG. 1B and FIG. 8B, the glazing gasket molding body 120 which has the same cross-sectional shape as the applied glazing gasket molding material 110a and the same length as the separation between the first cut surface S1 and the second cut surface S2 is inserted between the first cut surface S1 and the second cut surface S2 on the top surface of the multilayer glass panel 100 and bonded with adhesive.

In this way, the glazing gasket 110 is formed around the entire periphery of the top surface of the multilayer glass panel 100 as illustrated in FIG. 1A.

When the glazing gasket 110 has been formed on a first surface of the multilayer glass panel 100, the multilayer glass panel 100 is inverted and placed on the table 1202, and the glazing gasket 110 is formed on a second surface of the multilayer glass panel 100 in the same way. In this case, the glazing gasket 110 that has already been formed is placed on the elastic member 50, the die is pressed against the second surface of the multilayer glass panel 100, and both the elastic member 50 and the glazing gasket 110 are compressed, and the glazing gasket molding material 110a is applied.

According to this embodiment, using a simple configuration, the die 42 is pressed against the top surface of the multilayer glass panel 100, and it is possible to eject the glazing gasket molding material 110a and the adhesive 200A from the application nozzle 26 and apply them onto the top surface of the multilayer glass panel 100.

Therefore, it is possible to apply the glazing gasket molding material 110a ejected from the outlet 44 with pressure onto the glass surface, so even when the application nozzle 26 is moved at high speed, it is advantageous in that the glazing gasket molding material 110a is properly attached to the glass surface, and the glazing gasket molding material 110a is formed with the desired shape.

Also, the configuration is simply the elastic member 50 disposed on the table 1202, so compared with providing a mechanical or electrical impelling mechanism on the die 42 side or the table 1202 side, the structure is simple, which has the advantage that it is possible to reduce the cost of the glazing gasket molding apparatus 10.

Also, even when the positions that include the application starting point g1 and the application finishing point g2 are removed using the fixture plate 18, it is possible to absorb the step due to the thickness of the first plate portion 18A with the changes in the amount of compression of the elastic member 50, without operating the application nozzle elevator mechanism 38 at the location of the fixture plate 18.

Therefore, it is not necessary to control the raising or lowering of the die 42 or the table 1202 at locations near the application starting point and the application finishing point, which has the advantage that it is possible to reduce the cost of the glazing gasket molding apparatus 10.

Also, the fixture plate 18 is configured so that the first plate portion 18A and the second plate portion 18B sandwich the multilayer glass panel 100, so the fixture plate 18 can be attached/detached to/from the multilayer glass panel 100 with one touch, which has the advantage that the efficiency of the operation of applying the glazing gasket molding material 110a is significantly increased.

Instead of the fixture plate 18, a single plate member and conventional commonly known fixing fittings that are capable of detachably attaching the plate member to the top surface of the multilayer glass panel 100 so that it cannot move may be used. However, when the fixture plate 18 according to the embodiment is used, the fixture fittings are not necessary, which has the advantage that attaching and detaching the fixture plate 18 is simple.

The invention claimed is:

1. A manufacturing method for a glass panel with a glazing gasket for ejecting glazing gasket molding material together with adhesive from an application nozzle onto a periphery of a top surface of the glass panel that is facing upwards and placed on a table, the glass panel and the application nozzle being moved relative to one another to apply the glazing gasket molding material, the method comprising:

placing an elastic member on the table, the elastic member being made from an elastically deformable material;

placing the glass panel on the elastic member;

detachably attaching a fixture plate to a portion of the periphery of the top surface of the glass panel, so that the fixture plate is immoveable relative to the glass panel;

applying the glazing gasket molding material to the top surface of the glass panel by ejecting the glazing gasket together with the adhesive slanting downward from an outlet to the rear in a direction of movement of the application nozzle, while a portion of the application nozzle in which the outlet is formed is pressed against the top surface of the glass panel to compress the elastic member;

cutting portions on the fixture plate that include the application starting point and the application finishing point with a laser, and removing the portions that include the application starting point and the application finishing point together with the fixture plate from the surface of the glass panel;

bonding a glazing gasket molding body with adhesive to a portion on the top surface of the glass panel where the portions that include the application starting point and the application finishing point have been removed, the glazing gasket molding body having a same cross-sectional shape as the glazing gasket molding material applied to the top surface of the glass panel; and dividing the adhesive vertically by a partition wall such that a lower layer of adhesive is applied to the glass panel and an upper layer is applied to the glazing gasket molding material, and the lower layer and the upper layer of the adhesive are brought into contact by a termination of the partition wall.

2. A manufacturing method for a glass panel with a glazing gasket for ejecting glazing gasket molding material together with adhesive from an application nozzle onto a periphery of a top surface of the glass panel that is facing upwards and placed on a table, the glass panel and the application nozzle being moved relative to one another to apply the glazing gasket molding material, the method comprising:

placing an elastic member on the table, the elastic member being made from an elastically deformable material;

placing the glass panel on the elastic member;

detachably attaching a fixture plate to a portion of the periphery of the top surface of the glass panel, so that the fixture plate is immoveable relative to the glass panel;

performing a first application step, by applying the glazing gasket molding material to the fixture plate, starting at an application starting point located on the fixture plate, by ejecting the glazing gasket molding material together with the adhesive slanting downward from an outlet to the rear in a direction of movement of the application nozzle, while a portion of the application nozzle in which the outlet is formed is pressed against the fixture plate to compress the elastic member via the glass panel;

applying the glazing gasket molding material to the top surface of the glass panel in a second application step by ejecting the glazing gasket together with the adhesive slanting downward from an outlet to the rear in a direction of movement of the application nozzle, while a portion of the application nozzle in which the outlet is formed is pressed against the top surface of the glass panel to compress the elastic member;

performing a third application step, out from the top surface of the glass panel, by applying the glazing gasket molding material to the fixture plate, by ejecting the glazing gasket molding material together with the adhesive slanting downward from an outlet to the rear in a direction of movement of the application nozzle, and finishing application at an application finishing point located on the fixture plate, while the portion of the application nozzle is pressed against the fixture plate to compress the elastic member via the glass panel;

cutting portions on the fixture plate that include the application starting point and the application finishing point with a laser, and removing the portions that include the application starting point and the application finishing point together with the fixture plate from the surface of the glass panel; and bonding a glazing gasket molding body with adhesive to a portion on the top surface of the glass panel where the portions that include the application starting point and the application finishing point have been removed, the glazing gasket molding body having a same cross-sectional shape as the glazing gasket molding material applied to the top surface of the glass panel;

wherein, in the first, second and third application steps, the glazing gasket molding material and the adhesive are applied while keeping the application nozzle above the top surface of the glass plate vertically unchanged.

* * * * *